United States Patent
Hirakawa et al.

(10) Patent No.: US 7,922,394 B2
(45) Date of Patent: Apr. 12, 2011

(54) PROPELLER SHAFT FOR MOTOR VEHICLE

(75) Inventors: Junichi Hirakawa, Tochigi (JP); Toru Yamada, Tochigi (JP)

(73) Assignee: Showa Corporation, Gyoda-shi (JP)

( * ) Notice: Subject to any disclaimer, the term of this patent is extended or adjusted under 35 U.S.C. 154(b) by 731 days.

(21) Appl. No.: 11/947,860

(22) Filed: Nov. 30, 2007

(65) Prior Publication Data

US 2008/0267550 A1    Oct. 30, 2008

(30) Foreign Application Priority Data

Apr. 25, 2007  (JP) ................... 2007-116187

(51) Int. Cl.
*F16C 27/00*     (2006.01)
*B60K 17/24*     (2006.01)

(52) U.S. Cl. .......................... 384/536; 180/381

(58) Field of Classification Search ................ 384/535, 384/536, 581, 582, 611, 612, 620; 180/381
See application file for complete search history.

(56) References Cited

U.S. PATENT DOCUMENTS

| 5,492,418 | A  * | 2/1996  | Brossard ................... 384/536 |
| 6,276,837 | B1 * | 8/2001  | Iwano ....................... 384/536 |
| 6,422,947 | B1 * | 7/2002  | Kelly et al. ............... 464/182 |
| 6,960,024 | B2 * | 11/2005 | Robb et al. ................. 384/536 |
| 7,611,288 | B2 * | 11/2009 | Lew ........................... 384/536 |
| 2002/0081050 | A1 * | 6/2002 | Cermak ...................... 384/536 |

FOREIGN PATENT DOCUMENTS

JP    2006-151056    6/2006

* cited by examiner

*Primary Examiner* — James Pilkington
(74) *Attorney, Agent, or Firm* — Babcock IP, PLLC

(57) ABSTRACT

In a propeller shaft for a motor vehicle, an outer periphery of an outer end of an annular support member is formed as an expanded poison.

15 Claims, 4 Drawing Sheets

PROPELLER SHAFT FOR MOTOR VEHICLE

BACKGROUND OF THE INVENTION

1. Field of the Invention

The present invention relates to a propeller shaft for a motor vehicle.

2. Description of the Related Art

As a propeller shaft for a motor vehicle, there has been a structure described in Japanese Patent Application Laid-open No. 2006-151056 (patent document 1). As shown in FIG. 4, the propeller shaft for the motor vehicle fits a shaft-like inner 3 of the constant velocity joint 1C provided in the other split shaft 1B to a tubular outer 2 of the constant velocity joint 1C provided in one split shaft 1A. A bearing 4 is loaded onto a shaft of the inner 3 to an inner periphery of an annular support member 5. The bearing 4 is positioned by stopper means 6 and 7 (the stopper means 7 is integrally formed in the inner 3) provided in the front side and the back side in an axial direction sandwiching the bearing 4 on the shaft of the inner 3, when coupling a plurality of split shafts 1A and 1B by a constant velocity joint 1C. Seal members 8 and 9 provided beside the front side and the back side of an inner periphery supporting the bearing 4 in an inner periphery of the annular support member 5 come into slidable contact with a small diameter portion in an outer periphery of the stopper means 6 and 7. Further, outer ends 5A and 5B extending to outer sides of the front side and the back side in an axial direction of the annular support member 5 come into close contact with a large diameter portion in the outer periphery of the stopper means 6 and 7 in the front side and the back side, and a gap with respect to the large diameter portion of the outer periphery is set to labyrinth seals La and Lb, whereby a muddy water or the like is prevented from making an intrusion into a side of the bearing 4 from the gap.

In patent document 1, the gap formed between the outer ends 5A and 5B of the annular support member 5 and the large diameter portion in the outer periphery of the stopper means 6 and 7 is open to an outer side in a radical direction, and the gap open to the outer side is set to an inlet of the labyrinth seals La and Lb. Accordingly, the muddy water scattered from an outer side and getting caught in the annular support member 5 tends to enter into the labyrinth seals La and Lb via the outer ends 5A and 5B of the annular support member 5 after traveling along an outer surface of the annular support member 5. The muddy water entering into the labyrinth seals La and Lb is exposed to a centrifugal force generated together with a rotation of the inner 3 so as to travel to a further inner side along the inner periphery of the annular support member 5, and reaches the seal members 8 and 9. The muddy water reaching the seal members 8 and 9 is reserved without being discharged, and there is a risk that an abnormal noise is generated.

SUMMARY OF THE INVENTION

An object of the present invention is to reduce a muddy water intrusion to an inner portion of an annular support member supporting a shaft-like inner, and to prevent an abnormal noise from being generated as well as intending to improve a sealing performance, in a propeller shaft for a motor vehicle.

The present invention relates to a propeller shaft for a motor vehicle comprising: the propeller shaft coupling a plurality of split shafts by joints, fitting a shaft-like inner of the joint provided in the other split shaft to a tubular outer of the joint provided in one split shaft, supporting a bearing loaded onto a shaft of the inner to an inner periphery of an annular support member, and positioning the bearing by stopper means provided in the front side and the back side in an axial direction sandwiching the bearing on the shaft of the inner; a seal member provided near a side of an inner periphery supporting the bearing in an inner periphery of the annular support member, the seal member coming into slidable contact with an outer periphery of the stopper means; and an outer end extending to an outer side in the axial direction of the annular support member, the outer end coming close to an outer shell of the stopper means, and a gap with respect to the outer shell being set to a labyrinth seal. An outer periphery of an outer end of the annular support member is formed as an expanded portion.

BRIEF DESCRIPTION OF THE DRAWINGS

The present invention will be more fully understood from the detailed description given below and from the accompanying drawings which should not be taken to be a limitation on the invention, but are for explanation and understanding only.

DESCRIPTION OF THE PREFERRED EMBODIMENTS

Figure 1:
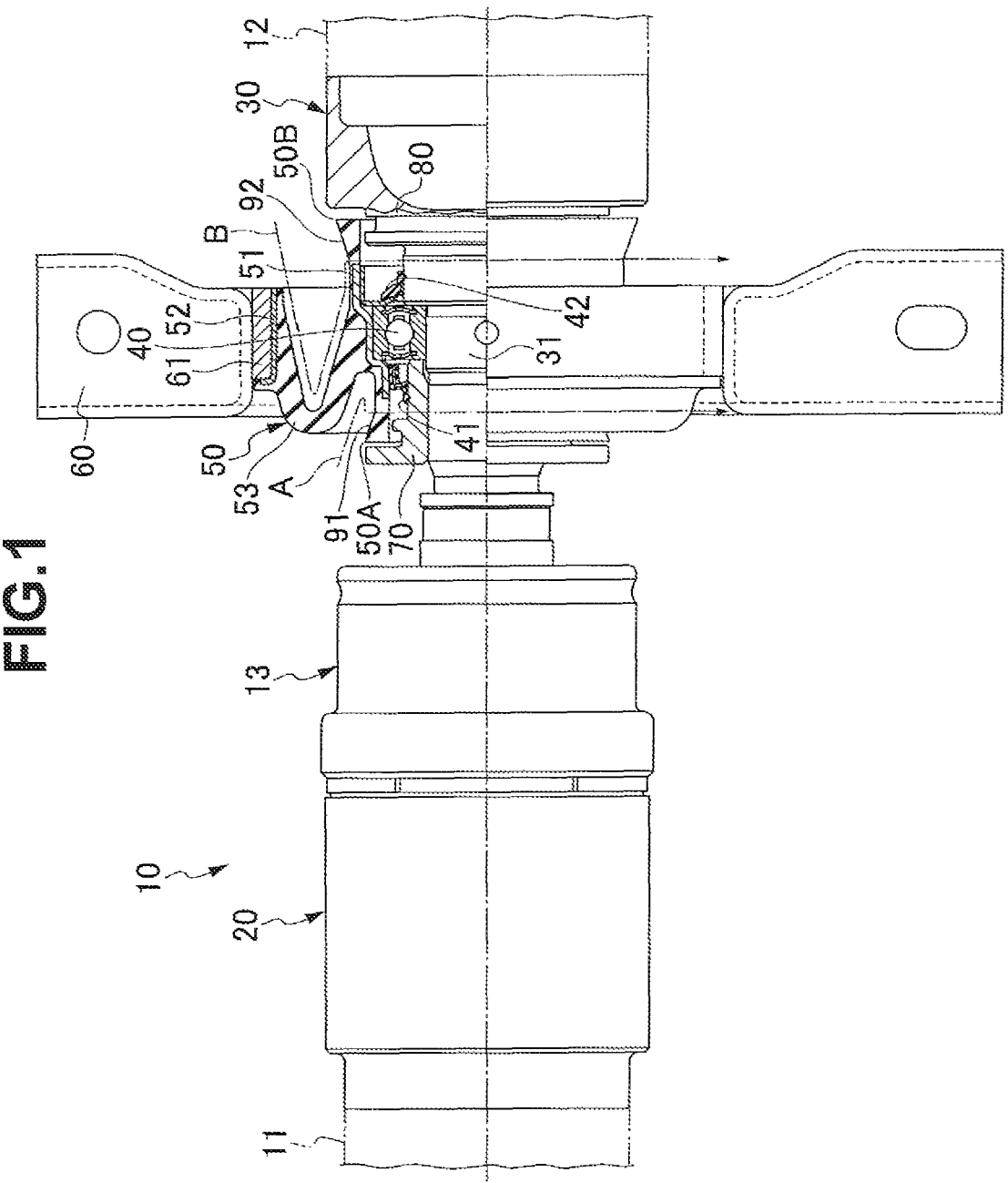
FIG. 1 is a cross-sectional view showing a propeller shaft for a motor vehicle.

A propeller shaft 10 for a motor vehicle (a front engine rear wheel drive vehicle or a four wheel drive vehicle) is constituted by two shaft members divided into a front side split shaft 11 and a rear side split shaft 12, and is structured by coupling both the split shafts 11 and 12 by a constant velocity joint (a slidable joint) 13, as shown in FIG. 1. A front end portion of the front side split shaft 11 is coupled to a connecting yoke connected to an output shaft of a transmission in an engine side via a universal joint, and a rear end portion of the rear side split shaft 12 is coupled to a connecting yoke connected to a differential gear via a universal joint.

The propeller shaft 10 connects a tubular outer 20 of the constant velocity joint 13 to one end of a hollow pipe constructing one split shaft 11 in accordance with a friction welding. Further, the propeller shaft 10 connects a shaft-like inner 30 of the constant velocity joint 13 to one end of the other split shaft 12. The inner 30 is fitted to the outer 20. An inner structure of the constant velocity joint 13 is not described in detail.

The propeller shaft 10 rotatably supports a bearing 40 loaded on a shaft of an inner shaft 31 constructing the inner 30 to an inner periphery of an annular support member 50, and is provided with the annular support member 50 in a mounting portion (an outer ring) 61 of a support base 60 fixed to a vehicle body side.

Figure 2:
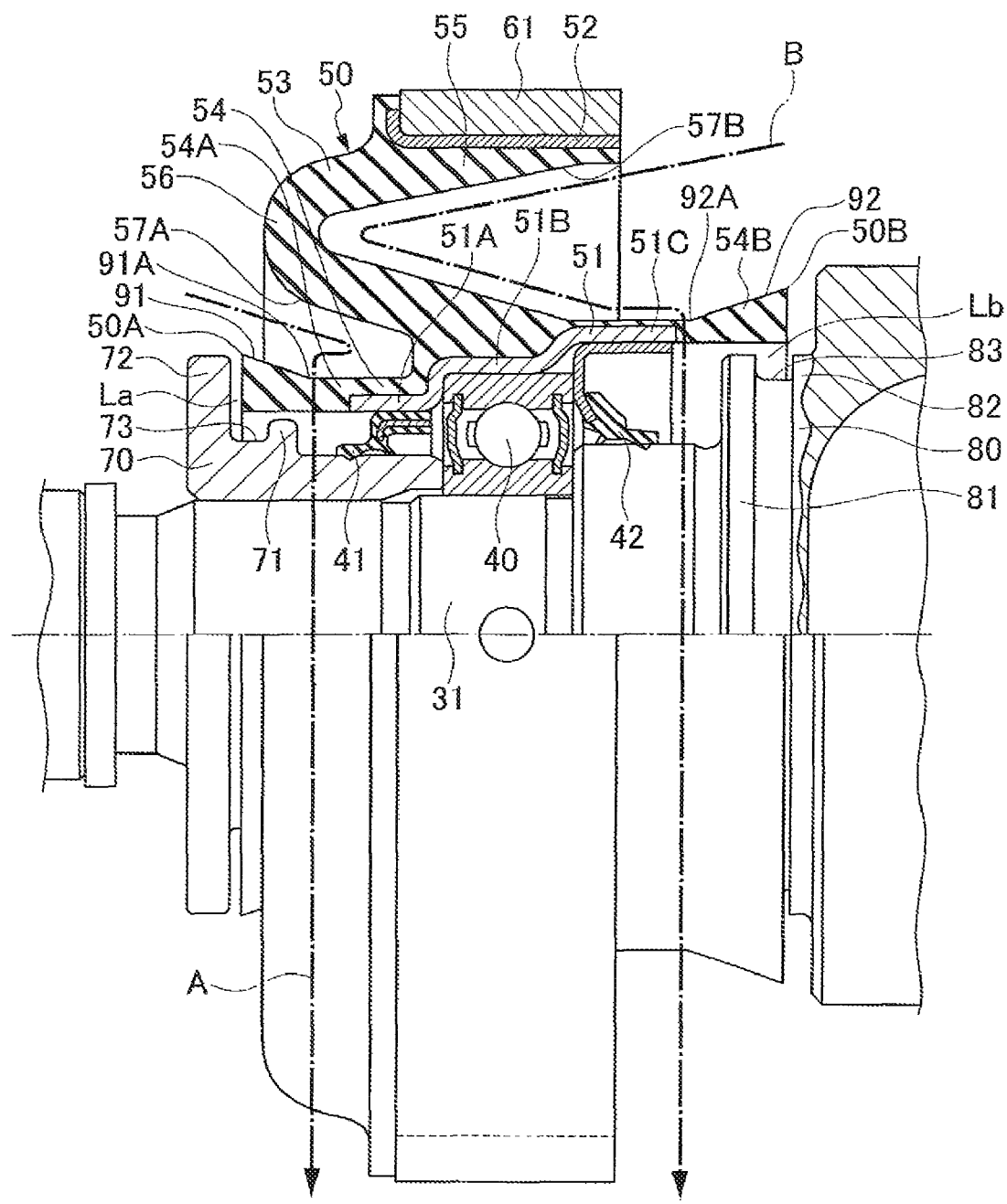
FIG. 2 is an enlarged cross-sectional view of a main portion in FIG. 1.

The annular support member 50 has an inner ring 51 supporting the bearing 40 in a fitting manner, an outer ring 52 press fitted to the mounting portion 61 of the support base 60, and a rubber-like elastic member 53 formed in such a manner as to cover an outer periphery of the inner ring 51 and an inner periphery of the outer ring 52, as shown in FIG. 2.

Figure 3:
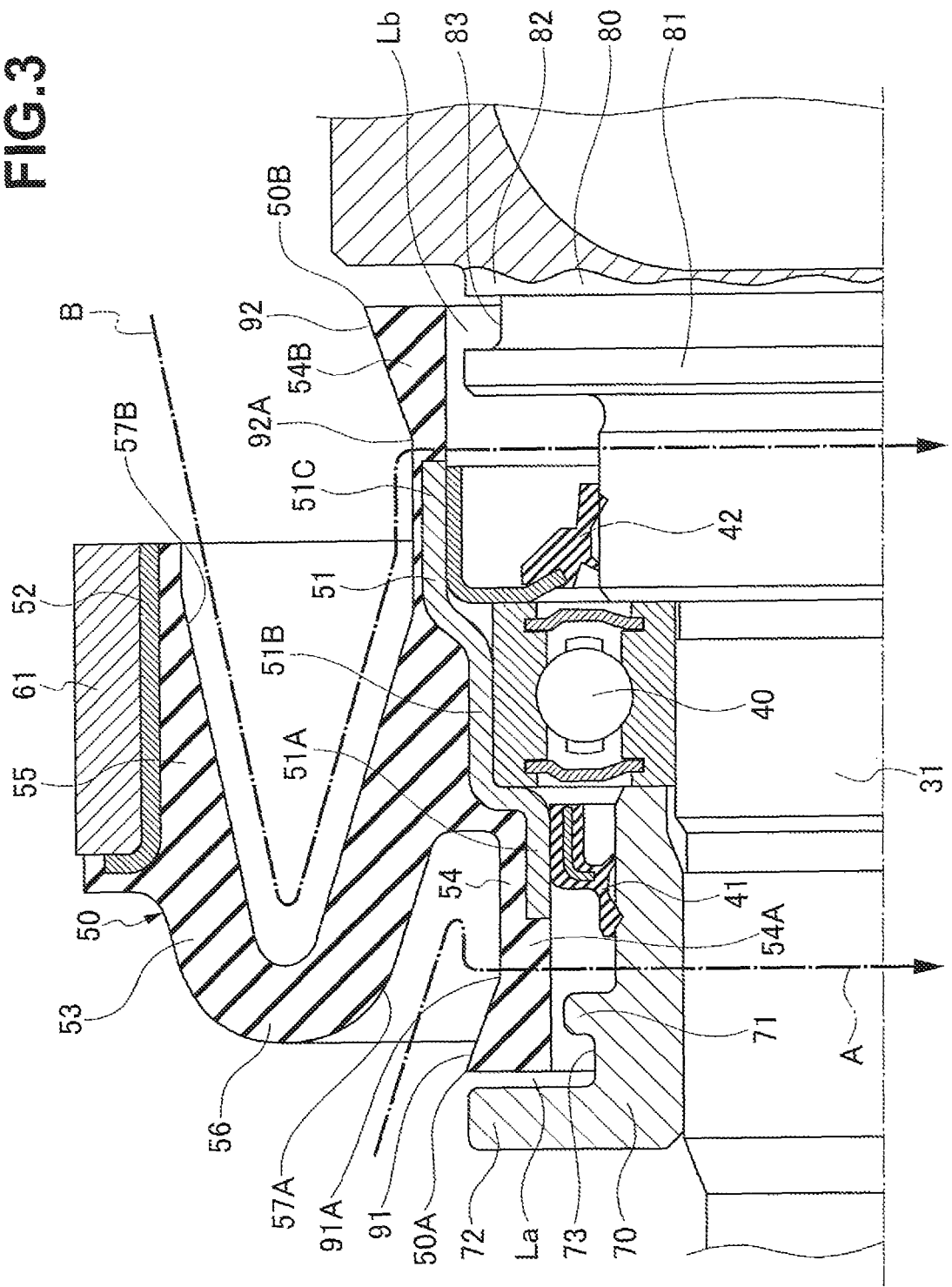
FIG. 3 is an enlarged cross-sectional view of an annular support member.
Figure 4:
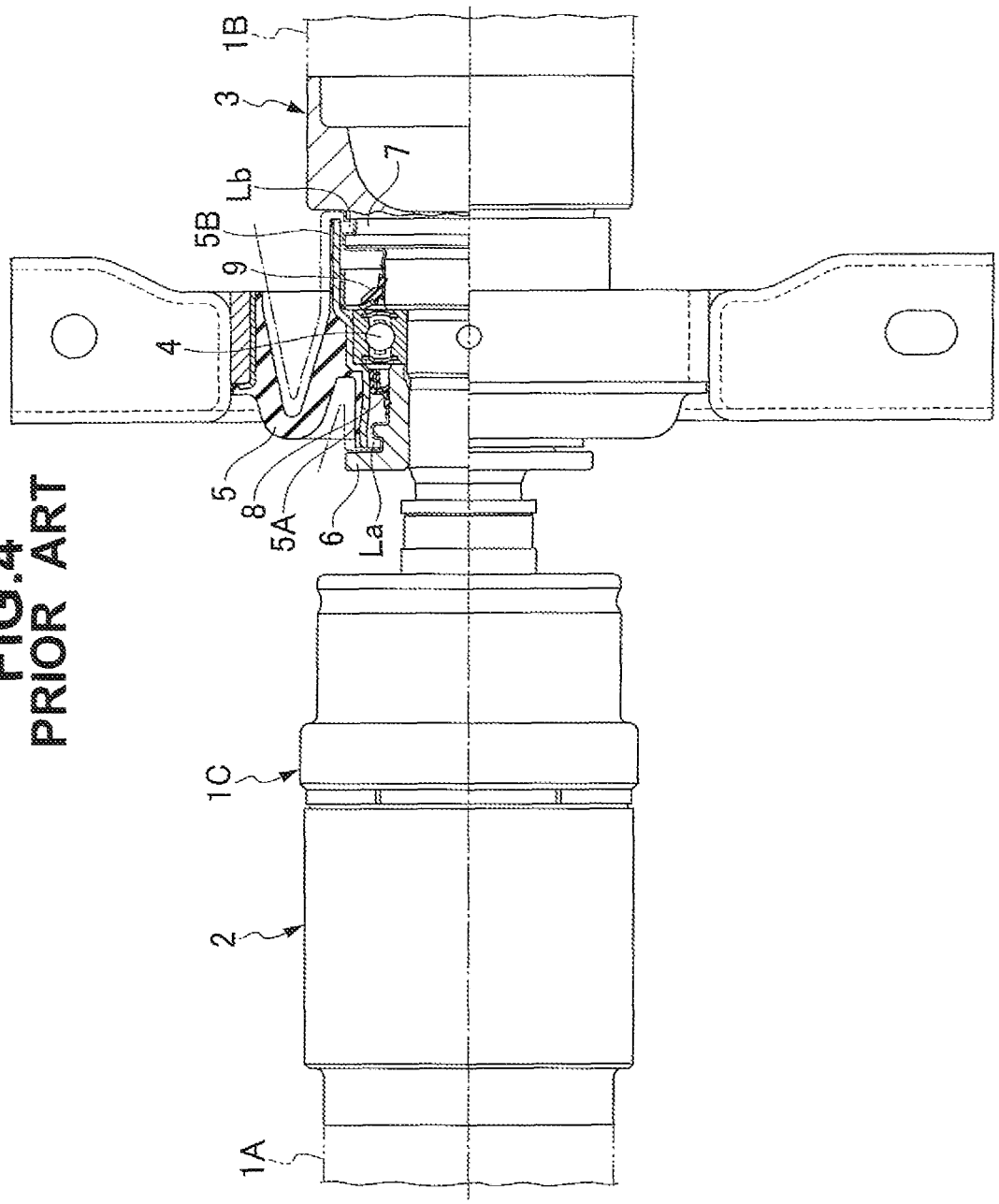
FIG. 4 is a cross-sectional view showing a prior art.

The annular support member 50 is manufactured by molding a rubber-like elastic member 53 such as a vulcanized rubber or the like between the inner ring 51 and the outer ring 52. The rubber-like elastic member 53 has an inner annular portion 54 close to the inner ring 51, an outer annular portion 55 close to the outer ring 52, and a joint annular portion 56 joining the inner annular portion 54 and the outer annular portion 55. The joint annular portion 56 is formed approximately in an S-shaped cross-sectional form (may be formed in the other cross-sectional shapes such as a U-shaped cross-sectional form, a flat cross-sectional shape and the like) in a cross-sectional view (FIGS. 1 to 3) including a center axis of the annular support member 50, is provided with a front inner annular portion 54A extending to a front side in an axial direction and a rear inner annular portion 54B extending to a rear side as the inner annular portion 54, and is structured such that a forward expanded U-shaped front annular concave portion 57A is formed between the front inner annular portion 54A and the joint annular portion 56, and a rearward expanded U-shaped rear annular concave portion 57B is formed between the rear inner annular portion 54B and the joint annular portion 56.

The annular support member 50 has leading end portions of the front and rear inner annular portions 54A and 54B of the inner annular portion 54 as front and rear outer ends 50A and 50B, and in the present embodiment, the outer ends 50A and 50B are extended to an outer side in the axial direction than the front and rear end portions (the small-diameter portion 51A and the large-diameter portion 51C) of the inner ring 51. The annular support member 50 extends the front outer end 50A to a position opposed to an outer shell (an inner end surface of an outer flange portion 72 in the present embodiment) of a front stopper means 70 mentioned below, and extends the rear outer end 50B to a position opposite to an outer shell (an inner end surface of an outer flange portion 82 in the present embodiment) of a rear stopper means 80 mentioned below. The inner ring 51 is formed in a stepped cylindrical shape connected so as to change a diameter in the order of the small-diameter portion 51A, the medium-diameter portion 51B and the large-diameter portion 51C in a longitudinal direction, within a range surrounded by the inner ring portion 54 of the rubber-like elastic member 53, and fits the outer ring of the bearing 40 to an inner periphery of the medium-diameter portion 51B.

The propeller shaft 10 loads the bearing 40 fitted to the medium-diameter portion 51B of the inner ring 51 of the annular support member 50 to the inner shaft 31 of the inner 30, and positions the bearing 40 by the front and rear stopper means 70 and 80 provided in the front side and the back side in an axial direction sandwiching the bearing 40 on an axis of the inner shaft 31. In the present embodiment, the front stopper means 70 is constituted by an annular stopper piece press fitted to the inner shaft 31, and the rear stopper means 80 is structured in accordance with an integral molding. Accordingly, the inner ring of the bearing 40 is sandwiched by an end surface of the front stopper means 70 and a step surface of the rear stopper means 80 so as to be positioned.

The propeller shaft 10 loads the seal members 41 and 42 to respective inner peripheries of the small-diameter portion 51A and the large-diameter portion 51C near the front side and the back side of the medium-diameter portion 51B supporting the bearing 40, in the inner periphery of the annular support member 50. The seal member 41 comes into slidable contact with the outer periphery of the front stopper means 70, the seal member 42 comes into slidable contact with the outer periphery of the rear stopper means 80, and the bearing 40 is sealed from the front side and the back side by the seal member 41 and the seal member 42.

The propeller shaft 10 is provided with an inner flange portion 71 and an outer flange portion 72 at two inner and outer positions existing in an outer side in an axial direction from an outer periphery with which the seal member 41 comes into slidable contact, in the outer periphery of the front stopper means 70, and is provided with an annular groove 73 between the inner flange portion 71 and the outer flange portion 72. Furthermore, the propeller shaft 10 is provided with an inner flange portion 81 and an outer flange portion 82 at two inner and outer positions existing in an outer side in an axial direction from an outer periphery with which the seal member 42 comes into slidable contact, in the outer periphery of the rear stopper means 80, and is provided with an annular groove 83 between the inner flange portion 81 and the outer flange portion 82.

The propeller shaft 10 is structured such that the front outer end 50A extending to an outer side in a front side in an axial direction of the annular support member 50 comes close to an outer shell including the inner flange portion 71 and the outer flange portion 72 of the front stopper means 70, and a gap with respect to the outer shell is set to a labyrinth seal La. Further, the rear outer end 50B extending to an outer side in a rear side in the axial direction of the annular support member 50 comes close to an outer shell including the inner flange portion 81 and the outer flange portion 82 of the rear stopper means 80, and a gap with respect to the outer shell is set to a labyrinth seal Lb. The labyrinth seals La and Lb form a narrow bent path by the gaps mentioned above between an outer space of the annular support member 50 and an inner space of the bearing 40 side, and forms a resistance for preventing a muddy water or the like scattered from an outer side during vehicle movement from directly making an intrusion into the inner portion of the annular support member 50. The muddy water making an intrusion into the inner portion of the annular support member 50 after passing through the labyrinth seals La and Lb is exposed to a centrifugal force generated by a rotation of the inner shaft 31 so as to travel to an inner side along the inner periphery of the annular support member 50, that is the front inner annular portions 54A and rear inner annular portion 54B in the present embodiment. And the muddy water is picked up by an annular groove 73 between the inner flange portion 71 and the outer flange portion 72, or an annular groove 83 between the inner flange portion 81 and the outer flange portion 82 so as to come down to a lower side while being guided, and an intrusion to the seal members 41 and 42 side is inhibited.

Accordingly, the propeller shaft 10 is provided with the following structure for reducing an intruding amount of the muddy water or the like into the inner portion of the annular support member 50 supporting the inner 30.

Outer peripheries of the front and rear outer ends 50A and 50B of the annular support member 50 are formed as expanded portions 91 and 92, and annular drain paths 91A and 92A are formed in a starting point region of an expansion of the expanded portions 91 and 92.

In the present embodiment, the expanded portions 91 and 92 are provided in accordance with a molding in the outer peripheries of the leading end portions (the front and rear outer ends 50A and 50B) of the front and rear inner annular portions 54A and 54B in the inner annular portion 54 of the rubber-like elastic member 53. At this time, the expanded portions 91 and 92 are provided in the outer periphery of the leading end portion extending to the outer side in the axial direction than the small-diameter portion 51A and the large-diameter portion 51C corresponding to the front and rear end portions of the inner ring 51, in the front inner annular portion 54A and the rear inner annular portion 54B of the rubber-like elastic member 53.

In the present embodiment, the front and rear expanded portions 91 and 92 are further expanded little by little in such a manner as to form a taper surface toward an outer side in the axial direction, in the outer periphery of the front and rear outer ends 50A and 50B (the leading end portions of the front and rear inner annular portions 54A and 54B) of the annular support member 50. Further, when the front outer end 50A of the annular support member 50 is opposed in the axial direction to the inner (rear) end surface (the end surface forming one wall of the annular groove 73) of the outer flange portion 72 of the front stopper means 70, an expanding direction along the taper surface of the expanded portion 91 passes through the outer side of the outer flange portion 72 (does not come into collision with the outer flange portion 72). Further, when the rear outer end 50B of the annular support member 50 is opposed in the axial direction to the inner (front) end surface (the end surface forming one wall of the annular groove 83) of the outer flange portion 82 of the rear stopper means 80, the expanding direction along the taper surface of the expanded portion 92 approximately passes through an outer side of a maximum outer diameter portion of the outer flange portion 82 (does not come into collision with the maximum outer diameter portion of the outer flange portion 82).

Accordingly, the propeller shaft 10 achieves the following operations and effects on the basis of the provision of the expanded portion 91 in the front outer end 50A of the annular support member 50. In this case, in FIGS. 1 to 3, reference symbol A denotes a flow path of the muddy water in the side of the front outer end 50A of the annular support member 50.

(a) The annular drain path 91A can be formed in the starting point region of the expansion of the expanded portion 91, by forming the outer periphery of the front outer end 50A of the annular support member 50 as the expanded portion 91. Accordingly, the muddy water scattered from the outer side and getting caught in the annular support member 50 travels along the outer surface of the annular support member 50, is thereafter picked up by the annular drain path 91A formed by the expanded portion 91 mentioned above before passing through the front outer end 50A of the annular support member 50, and is guided by the annular drain path 91A so as to flow down to the lower side while traveling along the outer periphery of the annular support member 50 in the circumferential direction. Accordingly, it is possible to prevent the muddy water getting caught in the annular support member 50 from entering into the labyrinth seal La. As a result, it is possible to reduce the intrusion of the muddy water or the like into the seal member 41 side in the inner portion of the annular support member 50, and it is possible to suppress the reduction of the sealing function so as to prevent the abnormal noise from being generated.

(b) Since the outer periphery of the front outer end 50A of the annular support member 50 is formed as the expanded portion 91 expanded little by little toward the outer side in the axial direction, particularly the muddy water which can not be picked up by the annular drain path 91A in the item (a) mentioned above formed by the expanded portion 91, muddy water getting caught in the annular support member 50 during vehicle movement is radiated along a diagonally continuing expanding direction of the expanded portion 91 from the front outer end 50A of the annular support member 50 with an outward component in a radial direction. Accordingly, it is possible to prevent the muddy water or the like getting caught in the annular support member 50 from entering into the labyrinth seal La.

(c) Since the structure is made such that the expanding direction of the expanded portion 91 passes through the outer side of the outer flange portion 72 when the front outer end 50A of the annular support member 50 is opposed to the outer flange portion 72 of the front stopper means 70 in the axial direction, the muddy water radiated to the outer side in the radial direction from the front outer end 50A of the annular support member 50 in the item (b) mentioned above passes through the outer side without coming into collision with the outer flange portion 72 of the front stopper means 70, and it is possible to reduce an amount entering into the labyrinth seal La.

(d) Since the expanded portion 91 is provided in accordance with the molding in the outer periphery of the front outer end 50A of the rubber-like elastic member 53 constructing the annular support member 50, it is possible to form the expanded portion 91 at the same time of molding the rubber-like elastic member 53.

(e) In the item (d) mentioned above, since the front outer end 50A of the rubber-like elastic member 53 extends to the outer side in the axial direction farther than the end portion of the inner ring 51, and the outer periphery of the extended portion is formed as the expanded portion 91, it is possible to enlarge a deflecting amount of the front outer end 50A during of molding the rubber-like elastic member 53, and it is possible to improve a mold releasing characteristic from the metal mold.

The propeller shaft 10 achieves the following operations and effects on the basis of the provision of the expanded portion 92 in the rear outer end 50B of the annular support member 50. In this case, in FIGS. 1 to 3, reference symbol B denotes a flow path of the muddy water in the side of the rear outer end 50B of the annular support member 50.

(a) The annular drain path 92A can be formed in the starting point region of the expansion of the expanded portion 92, by forming the outer periphery of the rear outer end 50B of the annular support member 50 as the expanded portion 92. Accordingly, the muddy water scattered from the outer side and getting caught in the annular support member 50 travels along the outer surface of the annular support member 50, is thereafter picked up by the annular drain path 92A formed by the expanded portion 92 mentioned above before passing through the rear outer end 50B of the annular support member 50, and is guided by the annular drain path 92A so as to flow down to the lower side while traveling along the outer periphery of the annular support member 50 in the circumferential direction. Accordingly, it is possible to prevent the muddy water getting caught in the annular support member 50 from entering into the labyrinth seal Lb. As a result, it is possible to reduce the intrusion of the muddy water or the like into the seal member 42 side in the inner portion of the annular support member 50, and it is possible to suppress the reduction of the sealing function so as to prevent the abnormal noise from being generated.

(b) Since the outer periphery of the rear outer end 50B of the annular support member 50 is formed as the expanded portion 92 expanded little by little toward the outer side in the axial direction, particularly the muddy water which can not be picked up by the annular drain path 92A in the item (a) mentioned above formed by the expanded portion 92 of muddy water getting caught in the annular support member 50 during vehicle movement is radiated along a diagonally continuing expanding direction of the expanded portion 92 from the rear outer end 50B of the annular support member 50 with an outward component in a radial direction. Accordingly, it is possible to reduce the muddy water or the like getting caught in the annular support member 50 from entering into the labyrinth seal Lb.

(c) Since the structure is made such that the expanding direction of the expanded portion 92 passes through the outer side of the outer flange portion 82 when the rear outer end 50B of the annular support member 50 is opposed to the outer flange portion 82 of the rear stopper means 80 in the axial direction, the muddy water radiated to the outer side in the radial direction from the rear outer end 50B of the annular support member 50 in the item (b) mentioned above passes through the outer side of a maximum outer diameter portion of the outer flange portion 82 without coming into collision with the outer flange portion 82 of the rear stopper means 80, and it is possible to reduce an amount entering into the labyrinth seal Lb.

(d) Since the expanded portion 92 is provided in accordance with the molding in the outer periphery of the rear outer end 50B of the rubber-like elastic member 53 constructing the annular support member 50, it is possible to form the expanded portion 92 at the same time of molding the rubber-like elastic member 53.

(e) In the item (d) mentioned above, since the rear outer end 50B of the rubber-like elastic member 53 extends to the outer side in the axial direction farther than the end portion of the inner ring 51, and the outer periphery of the extended portion is formed as the expanded portion 92, it is possible to enlarge a deflecting amount of the rear outer end 50B during molding the rubber-like elastic member 53, and it is possible to improve a mold releasing characteristic from the metal mold.

As heretofore explained, embodiments of the present invention have been described in detail with reference to the drawings. However, the specific configurations of the present invention are not limited to the embodiments but those having a modification of the design within the range of the present invention are also included in the present invention. For example, the expanded portion in accordance with the present invention is not limited to be integrally formed in the rubber-like elastic member 53 (the inner annular portion 54) of the annular support member 50, but may be integrally formed in the inner ring 51 of the annular support member 50, may be independently formed from each of the portions of the annular support member 50 so as to be additionally provided, or the like. Further, the expanded portion in accordance with the present invention is not limited to be expanded as the tapered shape in the outer periphery of the outer end of the annular support member, but may be expanded as a stepped shape by an annular protruding portion or the like.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A propeller shaft for a motor vehicle comprising:
a plurality of split shafts coupled by a joint, an inner shaft of the joint provided in one split shaft and a tubular outer of the joint provided in the other split shaft, a bearing positioned on the inner shaft and supported by an inner periphery of an annular support member, the bearing being positioned between a front stopper means and a rear stopper means in an axial direction sandwiching the bearing on the inner shaft;
a seal member provided proximate a side of the inner periphery supporting the bearing in an inner periphery of the annular support member, the seal member coming into slidable contact with an outer periphery of the stopper means;
an outer end extending to an outer side in the axial direction of the annular support member, the outer end outer side being positioned proximate to an outer shell of the stopper means, and a gap is formed between the outer end outer side and the outer shell of the stopper means, the gap forms a labyrinth seal;
wherein an outer periphery of the outer end of the annular support member is formed as an expanded portion, a diameter of the expanded portion increasing towards a periphery of the expanded portion in an axial direction, the expanded portion ending at said outer side.

2. A propeller shaft for a motor vehicle according to claim 1, wherein the expanded portion expands little by little toward said outer side in the axial direction.

3. A propeller shaft for a motor vehicle according to claim 2, wherein the annular support member has an inner ring fitted on the bearing, and an elastic member covers an outer periphery of the inner ring, and
wherein the expanded portion is formed by molding an outer periphery of an outer end of the elastic member.

4. A propeller shaft for a motor vehicle according to claim 3, wherein the outer end of the elastic member extends to an outer side in the axial direction further than the end portion of the inner ring.

5. A propeller shaft for a motor vehicle according to claim 4, wherein the annular support member extends to a front side and a back side in the axial direction sandwiching the bearing, and the expanded portion is provided in each of a front side outer end and a back side outer end of the annular support member.

6. A propeller shaft for a motor vehicle according to claim 3, wherein the annular support member extends to a front side and a back side in the axial direction sandwiching the bearing, and the expanded portion is provided in each of a front side outer end and a back side outer end of the annular support member.

7. A propeller shaft for a motor vehicle according to claim 2, wherein the annular support member extends to a front side and a back side in the axial direction sandwiching the bearing, and the expanded portion is provided in each of a front side outer end and a back side outer end of the annular support member.

8. A propeller shaft for a motor vehicle according to claim 2, wherein an annular drain path is formed in a starting point region of the expansion of the expanded portion.

9. A propeller shaft for a motor vehicle according to claim 1, wherein the annular support member has an inner ring fitted on the bearing, and an elastic member covers an outer periphery of the inner ring, and
wherein the expanded portion is formed by molding an outer periphery of an outer end of the elastic member.

10. A propeller shaft for a motor vehicle according to claim 9, wherein the outer end of the elastic member extends to an outer side in the axial direction further than the end portion of the inner ring.

11. A propeller shaft for a motor vehicle according to claim 10, wherein the annular support member extends to a front side and a back side in the axial direction sandwiching the bearing, and the expanded portion is provided in each of a front side outer end and a back side outer end of the annular support member.

12. A propeller shaft for a motor vehicle according to claim 9, wherein the annular support member extends to a front side and a back side in the axial direction sandwiching the bearing, and the expanded portion is provided in each of a front side outer end and a back side outer end of the annular support member.

13. A propeller shaft for a motor vehicle according to claim 1, wherein the annular support member extends to a front side and a back side in the axial direction sandwiching the bearing, and the expanded portion is provided in each of a front side outer end and a back side outer end of the annular support member.

14. A propeller shaft for a motor vehicle according to claim 1, wherein an annular drain path is formed in a starting point region of the expansion of the expanded portion.

15. A propeller shaft for a motor vehicle according to claim 1, wherein the front stopper means and the rear stopper means are each provided with an inner flange portion and an outer flange portion, the flanges being positioned on an outer side in an axial direction further than the outer periphery of the front stopper means and the rear stopper means with which the sealing member comes into slidable contact, and an annular grove is provided between the inner flange portion and the outer flange portion.

* * * * *